US012693112B2

(12) United States Patent
Yuan et al.

(10) Patent No.: US 12,693,112 B2
(45) Date of Patent: Jul. 28, 2026

(54) METHOD FOR SUPER-RESOLUTION MICROSCOPIC INTERFEROMETRIC MEASUREMENT BASED ON BROADBAND ANNULAR RADIALLY POLARIZED LIGHT

(71) Applicant: NANJING UNIVERSITY OF SCIENCE AND TECHNOLOGY, Nanjing (CN)

(72) Inventors: Qun Yuan, Nanjing (CN); Xiangnan Hou, Nanjing (CN); Jiale Zhang, Nanjing (CN); Chen Ding, Nanjing (CN); Cong Luo, Nanjing (CN); Zhenyan Guo, Nanjing (CN); Zhishan Gao, Nanjing (CN)

(73) Assignee: NANJING UNIVERSITY OF SCIENCE AND TECHNOLOGY, Nanjing (CN)

( * ) Notice: Subject to any disclaimer, the term of this patent is extended or adjusted under 35 U.S.C. 154(b) by 0 days.

(21) Appl. No.: 19/285,582

(22) Filed: Jul. 30, 2025

(65) Prior Publication Data

US 2026/0146849 A1    May 28, 2026

(30) Foreign Application Priority Data

Nov. 28, 2024    (CN) .......................... 202411719297.7

(51) Int. Cl.
*G01B 11/24* (2006.01)
*G01B 9/02001* (2022.01)
(Continued)

(52) U.S. Cl.
CPC ...... *G01B 11/2441* (2013.01); *G01B 9/02011* (2013.01); *G01B 9/02015* (2013.01); *G02B 21/0032* (2013.01); *G02B 21/0056* (2013.01)

(58) Field of Classification Search
CPC ............ G01B 11/2441; G01B 9/02011; G01B 9/02015; G02B 21/0032; G02B 21/0056
(Continued)

(56) References Cited

U.S. PATENT DOCUMENTS 6,404,544 B1    6/2002 Kuhn
11,965,780 B2 *   4/2024 Bowman ................ G02B 21/16
2017/0185036 A1 *   6/2017 Brooker ................... G02B 3/08

FOREIGN PATENT DOCUMENTS

CN        109581645 A    4/2019
CN        109975820 A    7/2019
(Continued)

OTHER PUBLICATIONS

Machine translation of First Office Action and Search Report from Chinese Patent Office, filed under Chinese Application No. 202411719297.7, 7 pages.

(Continued)

*Primary Examiner* — Md M Rahman
(74) *Attorney, Agent, or Firm* — Vedder Price P.C.

(57)        ABSTRACT

Disclosed in this disclosure is a method for super-resolution microscopic interferometric measurement based on broad-band annular radially polarized light, where a broad-spectrum light source with an extended surface is selected; uniform illumination covering a to-be-tested FOV and having a certain aperture angle is provided using a Kohler illumination system; a two-stage relay system is designed, and amplitude and polarization of a full-FOV beam is modulated by a liquid crystal spatial light modulator and a vortex waveplate; broadband annular radially polarized light is focused based on the extended surface light source and a microscopic objective lens with a high numerical aperture to implement super-resolution microscopic interference imaging of a sample; and super-resolution topography measure- (Continued)

ment directed at a surface of a microstructure is implemented combined with phase-shifting interferometry.

10 Claims, 4 Drawing Sheets

(51) Int. Cl.
　　*G01B 9/02015*　　　(2022.01)
　　*G02B 21/00*　　　　(2006.01)
(58) Field of Classification Search
　　USPC ........................................................ 356/495
　　See application file for complete search history.

(56) References Cited

FOREIGN PATENT DOCUMENTS

| | | | |
|---|---|---|---|
| CN | 111736376 A | 10/2020 |
| CN | 113777049 A | 12/2021 |
| CN | 114705630 A | 7/2022 |
| CN | 118641522 A | 9/2024 |
| GB | 0512030 | 7/2005 |
| JP | H08249716 A | 9/1996 |
| JP | 2021085698 A | 6/2021 |

OTHER PUBLICATIONS

Songtao etal, Self-Focusing Characteristics of Circular Array Airy Vortex Beams, Chinese Journal of Lasers (Apr. 2019), pp. 0405002:1-0405002:8, vol. 46, No. 4, China Academic Journal Electronic Publishing House, available at <http:/www.cnki.net> China.

Machine translation of Supplemental Search Report from Chinese Patent Office, filed under Chinese Application No. 202411719297.7, 2 pages.

Machine translation of Notification of Grant of Patent from Chinese Patent Office, filed under Chinese Application No. 202411719297.7, 1 pages.

Meng, Peiwen et al., Demonstration of lateral resolution enhancement by focusing amplitude modulated radially polarized light in a confocal imaging system, Journal of Optics (Mar. 16, 2020), pp. 045605: 1-045605: 5, vol. 22, No. 4, IOP Publishing Ltd, available at <https://iopscience.iop.org/article/10.1088/2040-8986/ab7aeb>.

Lerman, Gilad M. and Levy, Uriel, Effect of radial polarization and apodization on spot size under tight focusing conditions, Optical Society of America—Optics Express (Mar. 31, 2008), pp. 4567-4581, vol. 16, No. 7, Optica Publishing Group, available at <https://opg.optica.org/oe/fulltext.cfm?uri=oe-16-7-4567&id=156118>.

Quabis, S. et al., Focusing Light to a tighter spot, Optics Communications (May 25, 2000), pp. 1-7, vol. 179, Issues 1-6, Science Direct—Elsevier, available at <https://www.sciencedirect.com/science/article/abs/pii/S0030401899007294>.

Youngworth, K.S. and Brown, T.G., Focusing of high numerical aperture cylindrical-vector beams, Optical Society of America—Optics Express (Jul. 17, 2000), pp. 77-87, vol. 7, No. 2, Optica Publishing Group, available at <https://opg.optica.org/OE/fulltext.cfm?uri=OE-7-2-77&id=63487>.

* cited by examiner

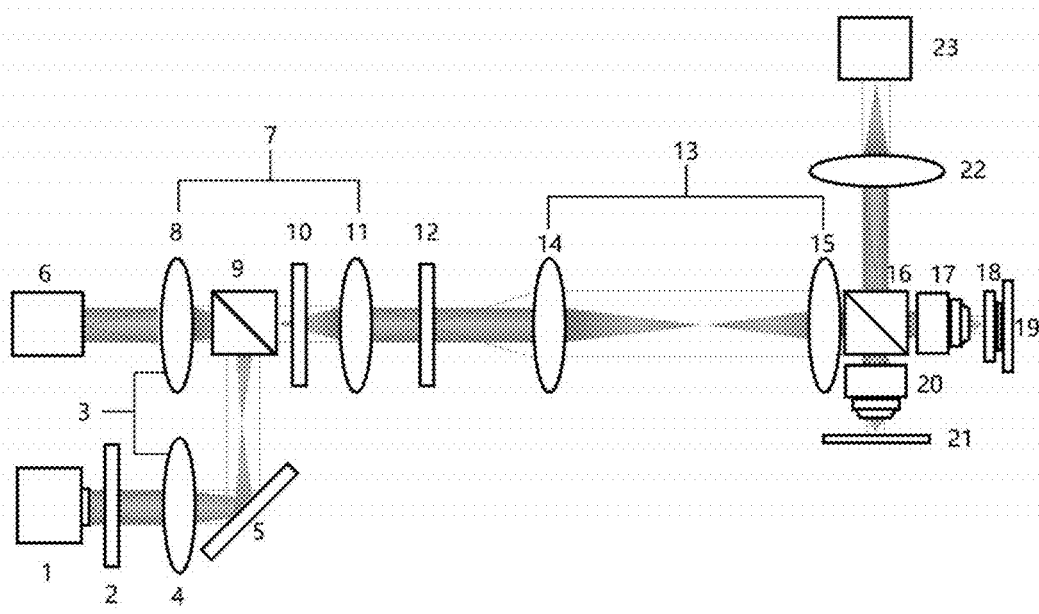

FIG. 1

| designing a two-stage relay system, and performing, by a spatial light modulator and a vortex waveplate, amplitude and polarization modulation on a full-FOV beam |
|---|
| building a system for super-resolution microscopic interferometric measurement based on broadband annular radially polarized light |
| focusing broadband annular radially polarized light based on a light source with an extended surface and a microscopic objective lens with a great numerical aperture to implement super-resolution microscopic interference imaging of a sample |
| controlling micro-displacement of the sample to be tested along a direction of an optical axis, and acquiring several phase-shifted interferograms of the sample to be test |
| processing, using a vertical scan interference algorithm, the acquired phase-shifting interferograms to obtain 3D topography information of the sample to be test |

FIG. 2

METHOD FOR SUPER-RESOLUTION MICROSCOPIC INTERFEROMETRIC MEASUREMENT BASED ON BROADBAND ANNULAR RADIALLY POLARIZED LIGHT

CROSS-REFERENCE TO RELATED APPLICATION

The present disclosure claims priority to Chinese Patent Application No. 202411719297.7 filed on Nov. 28, 2024, which is incorporated herein by reference in its entirety.

FIELD OF THE INVENTION

This disclosure belongs to field of optical microscopic topography interferometric measurement, and specifically relates to a method for super-resolution microscopic interferometric measurement based on broadband annular radially polarized light.

BACKGROUND OF THE INVENTION

Microscopic interferometry enables nondestructive measurement of three-dimensional (3D) topography of a microstructure, where an axial resolution of 0.1 nm may be achieved using low-coherence vertical scan, whereas a highest lateral resolution thereof is just about 200 nm, limited by a diffraction limit of microscopic imaging, even with a 100× interference microscopic objective lens.

Due to a diffraction effect by a limited aperture, an optical imaging system may exhibit a diffraction-limited resolution. In case of no optical aberration, i.e., limited diffraction, according to a definition of an imaging resolution by Abbe, a limit of a lateral resolution reachable by an optical microscope based on incoherent illumination is $\lambda/2NA$ (NA being a numerical aperture of an optical system). Due to diffraction of an optical wave by the limited aperture in the optical imaging system, a resolution of optical microscopic imaging is limited by the diffraction limit and cannot be further improved.

A series of fluorescence super-resolution microscopic imaging technologies have been rapidly developed recently in more than a decade, of which a sophisticated one at present is a method for super-resolution microscopic imaging based on single-molecule imaging, including photoactivated localization microscopy (PALM), stochastic optical reconstruction microscopy (STORM), fluorescence photoactivation localization microscopy (FPALM), and stimulated emission depletion (STED) microscopy which improves the imaging resolution by changing a point spread function of a light source, widely applied to biomedical field. However, these technologies require labeling a sample using a specific fluorescence probe, while the technology means cannot be introduced into microscopic interferometric measurement.

Light field regulation is an effective means to improve a system optical resolution, including annular aperture modulation and polarization state modulation. Research shows that radially polarized light is polarized light exhibiting perfect axisymmetric distribution, with electric field vectors distributed symmetrically along an optical axis and each oriented, and with a significantly enhanced longitudinal component when focused under a high numerical aperture, where a focal spot smaller than natural light may be generated by increasing an annular aperture to weaken a lateral component.

At present, a light source used in research of super-resolution technology for radially polarized light is a monochromatic laser light source, with a smaller imaging field of view (FOV), and an electric displacement platform is needed to perform spot scan for super-resolution imaging of a sample. In "Demonstration of lateral resolution enhancement by focusing amplitude modulated radially polarized light in a confocal imaging system", Peiwen Meng et al., an experimental system is built, verifying a super-resolution microscopic effect with radially polarized light, where a light source used is a He—Ne laser with a wavelength 632.8 nm, together with an electric displacement platform to perform spot scan on a sample. The above imaging mode exhibit low efficiency, and spot scan exhibits greater limitation for 3D topography measurement of a microstructure.

SUMMARY OF THE INVENTION

This disclosure provides a method for super-resolution microscopic interferometric measurement based on broadband annular radially polarized light, solving low efficiency brought about by conventional laser spot scan, breaking a limitation to a lateral resolution in conventional microscopic topography interferometric measurement, improving upon a topography resolution in conventional microscopic interferometric measurement.

A technical solution which implements a goal of this disclosure is: a method for super-resolution microscopic interferometric measurement based on broadband annular radially polarized light, with steps as follows:

Step 1, Designing a two-stage relay system, for generating broadband annular radially polarized light;

The two-stage relay system includes a light source, a polarizer, a first condenser lens, a first standard plane mirror, a liquid crystal spatial light modulator, a second condenser lens, a first cube beamsplitter, an analyzer, a third condenser lens, and a vortex waveplate;

The first condenser lens and the second condenser lens constitute a first-stage relay lens group;

The second condenser lens and the third condenser lens constitute a second-stage relay lens group;

The light source, the polarizer, the first-stage relay lens group, the first standard plane mirror, the first cube beamsplitter, and the liquid crystal spatial light modulator constitute a first-stage relay system;

The liquid crystal spatial light modulator, the second-stage relay lens group, the first cube beamsplitter, the analyzer, and the vortex waveplate constitute a second-stage relay system;

The light source, the polarizer, the first condenser lens, and the first standard plane mirror are arranged coaxially in sequence along a first optical axis, where a reflective surface of the first standard plane mirror forms an angle of 45° with the first optical axis;

The liquid crystal spatial light modulator, the second condenser lens, the first cube beamsplitter, the analyzer, the third condenser lens, and the vortex waveplate are arranged coaxially in sequence along a second optical axis, where the first cube beamsplitter is located on a reflection optical path of the first standard plane mirror, and the broadband annular radially polarized light emerges from the vortex waveplate;

Step 2, Building a system for super-resolution microscopic interferometric measurement based on broadband annular radially polarized light;

The system for super-resolution microscopic interferometric measurement based on broadband annular radially polarized light includes the two-stage relay system, a fourth condenser lens, a fifth condenser lens, a second cube beamsplitter, a first microscopic objective lens, a to-be-tested sample, a lead zirconate titanate (PZT) piezoelectric ceramics, a second microscopic objective lens, a second standard plane mirror, a tube lens, and an industrial charge-coupled device (CCD) camera, where the to-be-tested sample is arranged on the PZT piezoelectric ceramics;

The fourth condenser lens, the fifth condenser lens, the second cube beamsplitter, the first microscopic objective lens, and the to-be-tested sample are arranged coaxially behind the vortex waveplate along the second optical axis; a third optical axis passes through the second cube beamsplitter; the second standard plane mirror, the second microscopic objective lens, the second cube beamsplitter, the tube lens, and the industrial CCD camera are distributed in sequence along the third optical axis; and the third optical axis is perpendicular to the second optical axis;

The first microscopic objective lens, the to-be-tested sample, and the PZT piezoelectric ceramics constitute a test optical path, while the second microscopic objective lens and the second standard plane mirror constitute a reference optical path;

The fourth condenser lens and the fifth condenser lens constitute a Kohler illumination lens group;

Step 3, Emitting, from the light source, a multi-FOV beam, where: the multi-FOV beam passes through the polarizer to generate a linearly polarized light; the linearly polarized light passes through the first condenser lens to be converged onto the first standard plane mirror, and is then reflected from the first standard plane mirror by 90°, onto the first cube beamsplitter; first reflected light reflected from the first cube beamsplitter passes through the second condenser lens to the liquid crystal spatial light modulator, the first reflected light being linearly polarized light with a polarization direction same as a long-side direction of a liquid crystal light valve of the liquid crystal spatial light modulator; hollow annular modulation and reflection is performed, by the liquid crystal spatial light modulator, on the linearly polarized light incident thereto to obtain a modulated annular beam as second reflected light; the second reflected light passes through the second condenser lens to the first cube beamsplitter, passes through the analyzer, with a polarization direction perpendicular to the polarizer, through the first cube beamsplitter, and is then converged onto the vortex waveplate through the third condenser lens, where the vortex waveplate performs polarization modulation on a full-FOV beam to output the broadband annular radially polarized light; the broadband annular radially polarized light then passes through the Kohler illumination lens group to the second cube beamsplitter, and is split, by the second cube beamsplitter, into test light and reference light, where the test light is transmitted to the first microscopic objective lens and passes through the first microscopic objective lens to illuminate the to-be-tested sample, and third reflected light carrying surface morphology information of the to-be-tested sample reflected from the to-be-tested sample passes through the first microscopic objective lens to the second cube beamsplitter, is reflected from the second cube beamsplitter into the tube lens, and is focused, by the tube lens, onto the industrial CCD camera, and where the reference light is reflected to the second microscopic objective lens and passes through the second microscopic objective lens to illuminate the second standard plane mirror, and fourth reflected light carrying surface morphology information of the second standard plane mirror reflected from the second standard plane mirror passes through the second microscopic objective lens to the second cube beamsplitter, transmits into the tube lens through the second cube beamsplitter, and is focused, by the tube lens, onto the industrial CCD camera, where meanwhile the reference light and the test light interfere with each other;

Step 4, Controlling, using the PZT piezoelectric ceramics, micro-displacement of the to-be-tested sample along a direction of an optical axis, and acquiring, by the industrial CCD camera, several phase-shifted interferograms of the to-be-tested sample within a full-FOV range of the first microscopic objective lens;

Step 5, Processing, using a vertical scan interference algorithm, the acquired phase-shifted interferograms to obtain 3D topography information of the to-be-tested sample.

Compared to prior art, outstanding advantages of this disclosure lie in that:

(1) the light source used in the method for super-resolution microscopic interferometric measurement based on broadband annular radially polarized light according to this disclosure is a broad-spectrum light source with an extended surface, and with a coherence length far less than a coherence length of a laser light source used in existing research, where through modulation of an interference signal by rapid attenuation of a coherence envelope, a significant interference signal occurs just when an optical path difference between a detection light and the reference light is close to zero; meanwhile, a divergence angle of the light source is matched to a to-be-tested FOV at an object side, uniform illumination covering the to-be-tested FOV and having a certain aperture angle is provided through a Kohler illumination system, where a full-FOV interferogram is obtained directly without performing spot scan on the to-be-tested sample using an electric displacement platform, when performing microscopic interference imaging on the to-be-tested sample, low efficiency brought about by conventional laser spot scan being broken;

(2) through the method for super-resolution microscopic interferometric measurement based on broadband annular radially polarized light according to this disclosure, the two-stage relay system is designed, and amplitude and polarization of the full-FOV beam is modulated by the liquid crystal spatial light modulator and the vortex waveplate, where the liquid crystal spatial light modulator modulates the beam of the light source to generate an annular hollow beam, and the vortex waveplate modulates the linearly polarized light to generate radially polarized light, which enables to directly generate the broadband annular radially polarized light, with a flexible structure, which is easy to adjust; and (3) through the method for super-resolution microscopic interferometric measurement based on broadband annular radially polarized light according to this disclosure, surface topography of a microstructure is measured through phase-shifting interferometry in a super-resolution microscopic interferometric measurement optical path, utilizing tight focusing characteristics of radially polarized light in combination with the broad-spectrum light source with an extended surface, breaking a limitation to a lateral resolution in conventional microscopic topography interferometric measurement, improving upon a topography resolution in conventional microscopic interferometric measurement.

BRIEF DESCRIPTION OF THE DRAWINGS

FIG. 1 is a diagram illustrating an experimental optical path for a method for super-resolution microscopic interferometric measurement based on broadband annular radially polarized light according to this disclosure.

FIG. 2 is a flowchart of a method for super-resolution microscopic interferometric measurement based on broadband annular radially polarized light according to this disclosure.

DETAILED DESCRIPTION OF THE EMBODIMENTS

Figure 3:
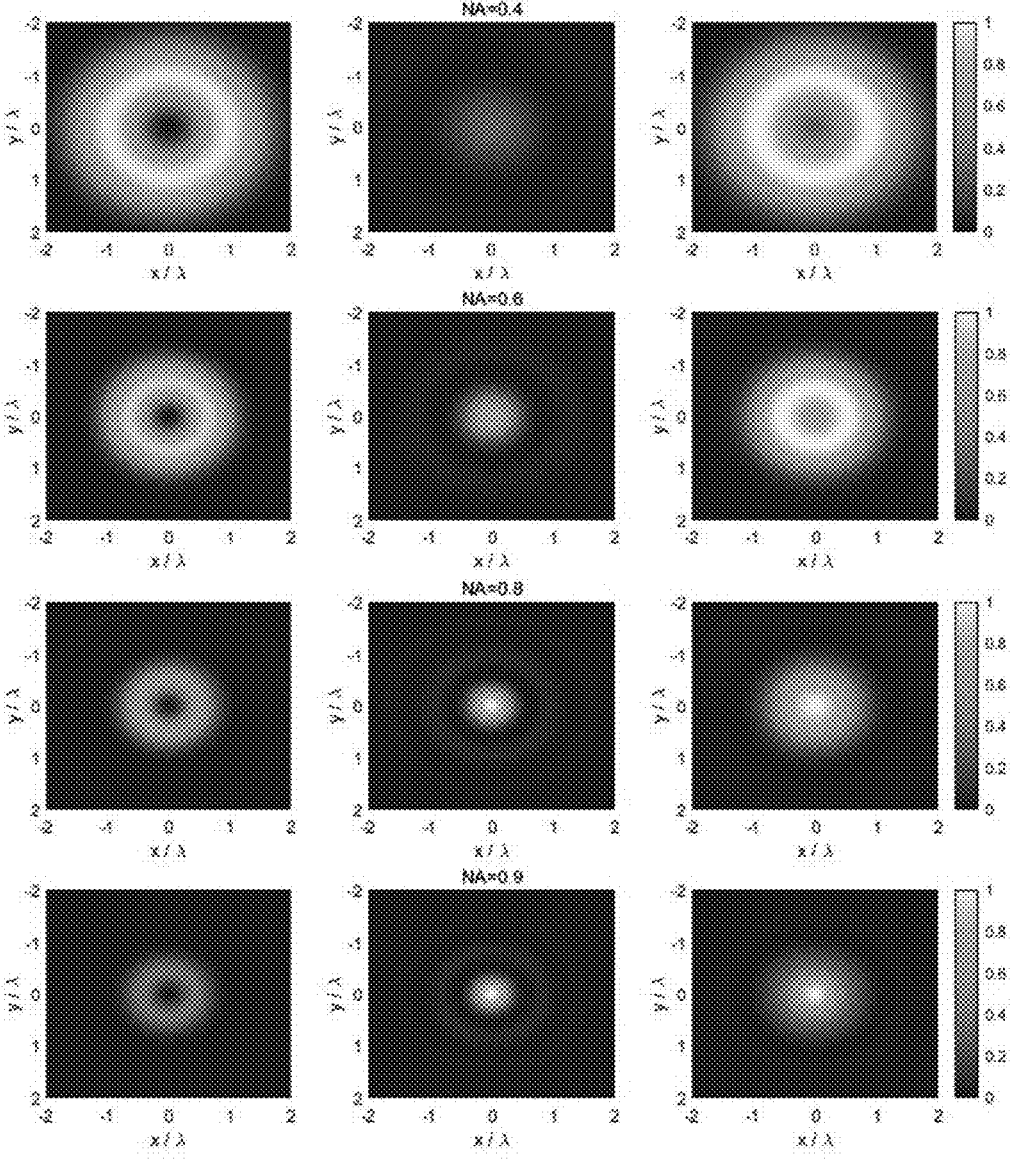
FIG. 3 is a diagram illustrating comparison of near-focal-point light field distributions when focusing radially polarized light by lenses of different numerical apertures. Focusing lenses in each of rows from top to bottom have numerical apertures NA=0.4, NA=0.6, NA=0.8, and NA=0.9, respectively; and each of columns from left to right represents a radial component, an axial component, and a total luminous intensity distribution, respectively.

A clear, complete description of technical solutions in embodiments of this disclosure is given below with reference to drawings in embodiments of this disclosure. Clearly, embodiments described are just some, rather than all, of embodiments of this disclosure. Any other embodiments obtained by a person of ordinary skill in the art based on embodiments in this disclosure without creative efforts fall in the scope of this disclosure.

In addition, in this disclosure, a description such as involving "first", "second", etc., is just for illustration, and should not be understood as indicating or suggesting relative importance thereof or implying the number of the technical feature(s) under consideration. Thus, a feature with a qualifier "first", "second", etc., may explicitly or implicitly include at least one such feature. In description of this disclosure, "multiple/plurality" means at least two, such as two, three, etc., unless specified otherwise.

Note that any directional indications (such as up, down, left, right, front, back . . . ) in embodiments of this disclosure are just for explaining a relation of relative locations, movements, etc., of components in a specific attitude (as shown in a figure). The directional indications also change accordingly if the specific attitude changes.

In this disclosure, unless clearly stipulated and defined otherwise, both "front" and "back" in terms "front focal plane" and "back focal plane" are stipulated according to a direction in which a ray propagates. Taking a lens as a reference, it is stipulated that a side of the lens on which the ray is incident is front, and that a side of the lens where the ray emerges is back.

In addition, respective technical solutions of embodiments of this disclosure may be combined with each other, as long as the combination can be implemented by a person of ordinary skill in the art. when a combination of technical solutions gives rise to a contradiction or cannot be implemented, it should be deemed that the combination of technical solutions does not exist, and is not in the scope claimed by this disclosure.

Detailed description of the embodiments, technical difficulties facing this disclosure, and an invention point of this disclosure are further introduced below with reference to this design example.

With reference to FIG. 1, a method for super-resolution microscopic interferometric measurement based on broadband annular radially polarized light includes steps as follows:

Step 1, Designing a two-stage relay system, for generating broadband annular radially polarized light;

The two-stage relay system includes a light source 1, a polarizer 2, a first condenser lens 4, a first standard plane mirror 5, a liquid crystal spatial light modulator 6, a second condenser lens 8, a first cube beamsplitter 9, an analyzer 10, a third condenser lens 11, and a vortex waveplate 12;

The first condenser lens 4 and the second condenser lens 8 constitute a first-stage relay lens group 3;

The second condenser lens 8 and the third condenser lens 11 constitute a second-stage relay lens group 7;

The light source 1, the polarizer 2, the first-stage relay lens group 3, the first standard plane mirror 5, the liquid crystal spatial light modulator 6, and the first cube beamsplitter 9 constitute a first-stage relay system;

The liquid crystal spatial light modulator 6, the second-stage relay lens group 7, the first cube beamsplitter 9, the analyzer 10, and the vortex waveplate 12 constitute a second-stage relay system;

The light source 1, the polarizer 2, the first condenser lens 4, and the first standard plane mirror 5 are arranged coaxially in sequence along a first optical axis, where a reflective surface of the first standard plane mirror 5 forms an angle of 45° with the first optical axis;

The liquid crystal spatial light modulator 6, the second condenser lens 8, the first cube beamsplitter 9, the analyzer 10, the third condenser lens 11, and the vortex waveplate 12 are arranged coaxially in sequence along a second optical axis, where the first cube beamsplitter 9 is located on a reflection optical path of the first standard plane mirror 5, and the broadband annular radially polarized light emerges from the vortex waveplate 12;

Step 2, Building a system for super-resolution microscopic interferometric measurement based on broadband annular radially polarized light;

The system for super-resolution microscopic interferometric measurement based on broadband annular radially polarized light includes the two-stage relay system, a fourth condenser lens 14, a fifth condenser lens 15, a second cube beamsplitter 16, a first microscopic objective lens 17, a to-be-tested sample 18, a lead zirconate titanate (PZT) piezoelectric ceramics 19, a second microscopic objective lens 20, a second standard plane mirror 21, a tube lens 22, and an industrial charge-coupled device (CCD) camera 23, where the to-be-tested sample 18 is arranged on the PZT piezoelectric ceramics 19;

The fourth condenser lens 14, the fifth condenser lens 15, the second cube beamsplitter 16, the first microscopic objective lens 17, and the to-be-tested sample 18 are arranged coaxially behind the vortex waveplate 12 along the second optical axis; a third optical axis passes through the second cube beamsplitter 16; the second standard plane mirror 21, the second microscopic objective lens 20, the second cube beamsplitter 16, the tube lens 22, and the industrial CCD camera 23 are distributed in sequence along the third optical axis; and the third optical axis is perpendicular to the second optical axis;

The first microscopic objective lens 17, the to-be-tested sample 18, and the PZT piezoelectric ceramics 19 constitute a test optical path, while the second microscopic objective lens 20 and the second standard plane mirror 21 constitute a reference optical path;

The fourth condenser lens 14 and the fifth condenser lens 15 constitute a Kohler illumination lens group 13;

Step 3, Emitting, from the light source 1, a multi-FOV beam, where: the multi-FOV beam passes through the polarizer 2 to generate a linearly polarized light; the linearly polarized light passes through the first condenser lens 4 to be converged onto the first standard plane mirror 5, and is then reflected from the first standard plane mirror 5 by 90°, onto the first cube beamsplitter 9; first reflected light reflected from the first cube beamsplitter 9 passes through the second condenser lens 8 to the liquid crystal spatial light modulator 6, the first reflected light being linearly polarized light with a polarization direction same as a long-side direction of a liquid crystal light valve of the liquid crystal spatial light modulator 6; hollow annular modulation and reflection is performed, by the liquid crystal spatial light modulator 6, on the linearly polarized light incident thereto to obtain a modulated annular beam as second reflected light; the second reflected light passes through the second condenser lens 8 to the first cube beamsplitter 9, passes through the analyzer 10, with a polarization direction perpendicular to the polarizer 2, through the first cube beamsplitter 9, and is then converged onto the vortex waveplate 12 through the third condenser lens 11, where the vortex waveplate 12 performs polarization modulation on a full-FOV beam to output the broadband annular radially polarized light; the broadband annular radially polarized light then passes through the Kohler illumination lens group 13 to the second cube beamsplitter 16, and is split, by the second cube beamsplitter 16, into test light and reference light, where the test light is transmitted to the first microscopic objective lens 17 and passes through the first microscopic objective lens 17 to illuminate the to-be-tested sample 18, and third reflected light carrying surface morphology information of the to-be-tested sample 18 reflected from the to-be-tested sample 18 passes through the first microscopic objective lens 17 to the second cube beamsplitter 16, is reflected from the second cube beamsplitter 16 into the tube lens 22, and is focused, by the tube lens 22, onto the industrial CCD camera 23, and where the reference light is reflected to the second microscopic objective lens 20 and passes through the second microscopic objective lens 20 to illuminate the second standard plane mirror 21, and fourth reflected light carrying surface morphology information of the second standard plane mirror 21 reflected from the second standard plane mirror 21 passes through the second microscopic objective lens 20 to the second cube beamsplitter 16, transmits into the tube lens 22 through the second cube beamsplitter 16, and is focused, by the tube lens 22, onto the industrial CCD camera 23, where meanwhile the reference light and the test light interfere with each other;

Step 4, Controlling, using the PZT piezoelectric ceramics 19, micro-displacement of the to-be-tested sample 18 along a direction of an optical axis, and acquiring, by the industrial CCD camera 23, several phase-shifted interferograms of the to-be-tested sample 18 within a full-FOV range of the first microscopic objective lens 17;

Step 5, Processing, using a vertical scan interference algorithm, the acquired phase-shifted interferograms to obtain 3D topography information of the to-be-tested sample 18;

It is an innovation of this disclosure to use of the broadband annular radially polarized light. The radially polarized light has a polarization state exhibiting spatial nonuniform distribution, and a diffraction field thereof is analyzed according to a Richards-wolf vector diffraction theory, to derive electric field distribution E and luminous intensity distribution I near a focal point under illumination of the broadband annular radially polarized light, which may be expressed as:

$$E = E_r + E_z,$$

$$I = E \cdot \bar{E},$$

where $E_r$ represents a radial polarization component, $E_z$ represents an axial polarization component, and $\bar{E}$ represents a conjugate of E.

$$E_r = \int_{m\alpha}^{\alpha} l_0(\theta) (\cos\theta)^{\frac{1}{2}} \sin2\theta J_1(kr_s\sin\theta) \exp(ikz_s\cos\theta) d\theta,$$

$$E_z = 2i \int_{m\alpha}^{\alpha} l_0(\theta) (\cos\theta)^{\frac{1}{2}} \sin^2\theta J_0(kr_s\sin\theta) \exp(ikz_s\cos\theta) d\theta$$

$\vec{r}$ represents a position vector of an observation point $S(r_s, z_s, \varphi_s)$ in an image space, represented in a cylindrical coordinate system, where $r_s$ represents a radial distance (i.e., a horizontal distance from a z axis to the point S) in the cylindrical coordinate system, $z_s$ represents an axial coordinate (i.e., a height of the point S in a z direction) in the cylindrical coordinate system, and $\varphi_s$ represents an azimuth angle (i.e., an angle of the point S relative to a positive direction of an x axis) in the cylindrical coordinate system.

NA represents a numerical aperture, $\alpha$ represents a maximum ray convergence angle, n represents an index of refraction, and $$a = \arcsin\left(\frac{NA}{n}\right);$$

$l_0(\theta)$ represents a pupil function, where a pupil function corresponding to a uniform plane wave is 1;

m represents an annular obscuration coefficient of the radially polarized light;

$J_n$ represents a Bessel function, with a property as follows:

$$\int_0^{2\pi} \cos n\varphi e^{i\rho\cos(\varphi-\gamma)} d\varphi = 2\pi i^n J_n(\rho) \cos n\gamma,$$

-continued $$\int_0^{2\pi} \sin n\varphi e^{i\rho\cos(\varphi-\gamma)} d\varnothing = 2\pi i^n J_n(\rho) \sin n\gamma$$

Electric field distributions near the focal point under illumination of the broadband annular radially polarized light at different NAs (0.4, 0.6, 0.8, and 0.9, respectively) are calculated by simulation, and a result shows that, in case of focus of the radially polarized light at a small numerical aperture (NA=0.4), a light field distribution at the focal point exhibits a hollow ring shape, where it is a radial component that makes a primary contribution to a total light field distribution, and an axial component of the light field is smaller in intensity. As a numerical aperture used for focusing increases, a proportion of the axial component of the light field increases, where in a case of NA=0.9, the axial component of the light field at the focal point plays a primary role for the light field distribution, in which case a light spot focused at the focal point exhibits an ideal circular spot, with a radius less than an prediction of a Rayleigh radius. The greater a numerical aperture of a focusing lens is, the less a full width at half maximum FWHM of a lateral luminous intensity curve of the focused light spot of the radially polarized light, indicating better tight focusing characteristics. Microscopic objective lenses of NA=0.9 are selected for the system for super-resolution microscopic interferometric measurement according to this disclosure.

Through simulating electric field distributions near the focal point under illumination of the broadband annular radially polarized light at different annular obscuration coefficients, a relationship among an annular obscuration coefficient m, a full width at half maximum FWHM $x(m)$ of the luminous intensity distribution near the focal point and a maximum value of luminous intensity $I_{max}(m)$ on a focal plane is fitted using a least squares method, to obtain function expressions as follows:

$$x(m) = -0.053 \cdot m^2 - 0.1529 \cdot m + 0.4012,$$

$$I_{max}(m) = -0.353 \cdot m^2 - 0.088 \cdot m + 0.365,$$

It may be seen that as the annular obscuration coefficient m increases, a value of the FWHM $x(m)$ of the luminous intensity distribution near the focal point where the radially polarized light focuses may decrease gradually, a system lateral resolution being improved. However, when m increases to 0.9 or more, the luminous intensity on the focal plane where the radially polarized light focuses may decline sharply. Considering influence of factors, such as a signal-to-noise ratio of a signal received by a detector in experiment, and exposure time of and a dynamic response range of the detector, etc., annular radially polarized light with the annular obscuration coefficient m=0.9 is selected as the broadband annular radially polarized light according to this disclosure.

A Linnik-type interference optical path is used for the system for the measurement according to this disclosure; two identical microscopic objective lenses are used respectively for the test optical path and the reference optical path; and combined with illumination of the broadband annular radially polarized light, an interference signal $I_{q,image}(x, y)$ actually received during vertical scan may be expressed as:

$$I_{q,image}(x, y) = I_q(x, y) * psf(x, y),$$

$$I_q(x, y) = I'\Bigg(1 + \exp\bigg\{-4\Big[\frac{h(x, y) + q \cdot \Delta z - z_0}{l_c}\Big]^2\bigg\} \cos\Big\{\frac{4\pi}{\lambda}[h(x, y) + q \cdot \Delta z - z_0] + \varnothing_0\Big\}\Bigg)$$

where $I_q(x,y)$ represents a scan interference signal without taking account of a diffraction effect;

$psf(x, y)$ represents a point spread function, $psf(x, y)=I=E \cdot \vec{E}$;

$h(x, y)$ represents a surface morphology function of the to-be-tested sample;

$I'$ represents a luminous intensity sum of a test arm and a reference arm;

$z_0$ represents a location where the test optical path and the reference optical path have equal optical paths, and $\varnothing_0$ represents a phase of the interference signal in case of the equal optical paths;

$\Delta z$ represents a scan step size, q represents a scan step number, and a scan full length $$z = q \cdot \Delta z;$$

$l_c$ represents the coherence length of the light source 1; and $\lambda$ represents a central wavelength of the light source 1.

According to a calibration rule for a white light microscopic interferometer specified in guidelines VDI/VDE 2655-1.1, a 3D resolution $\nabla_{3D}$ of a system for super-resolution microscopic interferometry may be expressed as:

$$\Lambda_{3D}(m) = a \cdot x(m) = a \cdot (-0.053 \cdot m^2 - 0.1529 \cdot m + 0.4012),$$

where $\alpha$ represents a coefficient related to a structural characteristic of the to-be-tested sample 18, where different structural characteristics correspond to different values of a, ranging between 2~3; and $x(m)$ represents the FWHM of the luminous intensity distribution near the focal point, characterizing a lateral resolution of the system for super-resolution microscopic interferometry; and as the annular obscuration coefficient m increases, the value of the FWHM x of the luminous intensity distribution near the focal point where the radially polarized light focuses may decrease gradually, the lateral resolution of the system for super-resolution microscopic interferometry being improved, and then the 3D resolution $\nabla_{3D}$ being improved.

EMBODIMENTS

Referring to FIG. 1, in this embodiment, a red light-emitting diode LED light source with a central wavelength of 629 nm and a bandwidth of 15 nm is used as the light source 1; the first condenser lens 4, the second condenser lens 8, and the third condenser lens 11 each have a focal length of 60 mm, the fourth condenser lens 14 has a focal length of 200 mm, and the fifth condenser lens 15 has a focal length of 100 mm; the liquid crystal spatial light modulator 6 is an amplitude-type reflective liquid crystal spatial light modulator; an LBTEK first-order vortex waveplate is used as the vortex waveplate 12; the first microscopic objective lens 17 and the second microscopic objective lens 20 each have a magnification ratio 100×, and a numerical aperture NA=0.9; and the tube lens 22 has a focal length of 200 mm. However, devices according to this disclosure are not limited as such.

For selection of objective lenses in the system, referring to FIG. 3, it is derived by simulation calculation that in a case of NA=0.9, an axial component of a light field at the focal point plays a primary role for the light field distribution, in which case a light spot focused at the focal point exhibits an ideal circular spot, with a radius less than an prediction of a Rayleigh radius. The greater a numerical aperture of a focusing lens is, the less a full width at half maximum FWHM of a lateral luminous intensity curve of the focused light spot of the radially polarized light, indicating better tight focusing characteristics. In this embodiment, microscopic objective lenses each having a magnification ratio 100× and a numerical aperture NA=0.9 are selected as the microscopic objective lens 17 and the microscopic objective lens 20.

Figure 4:
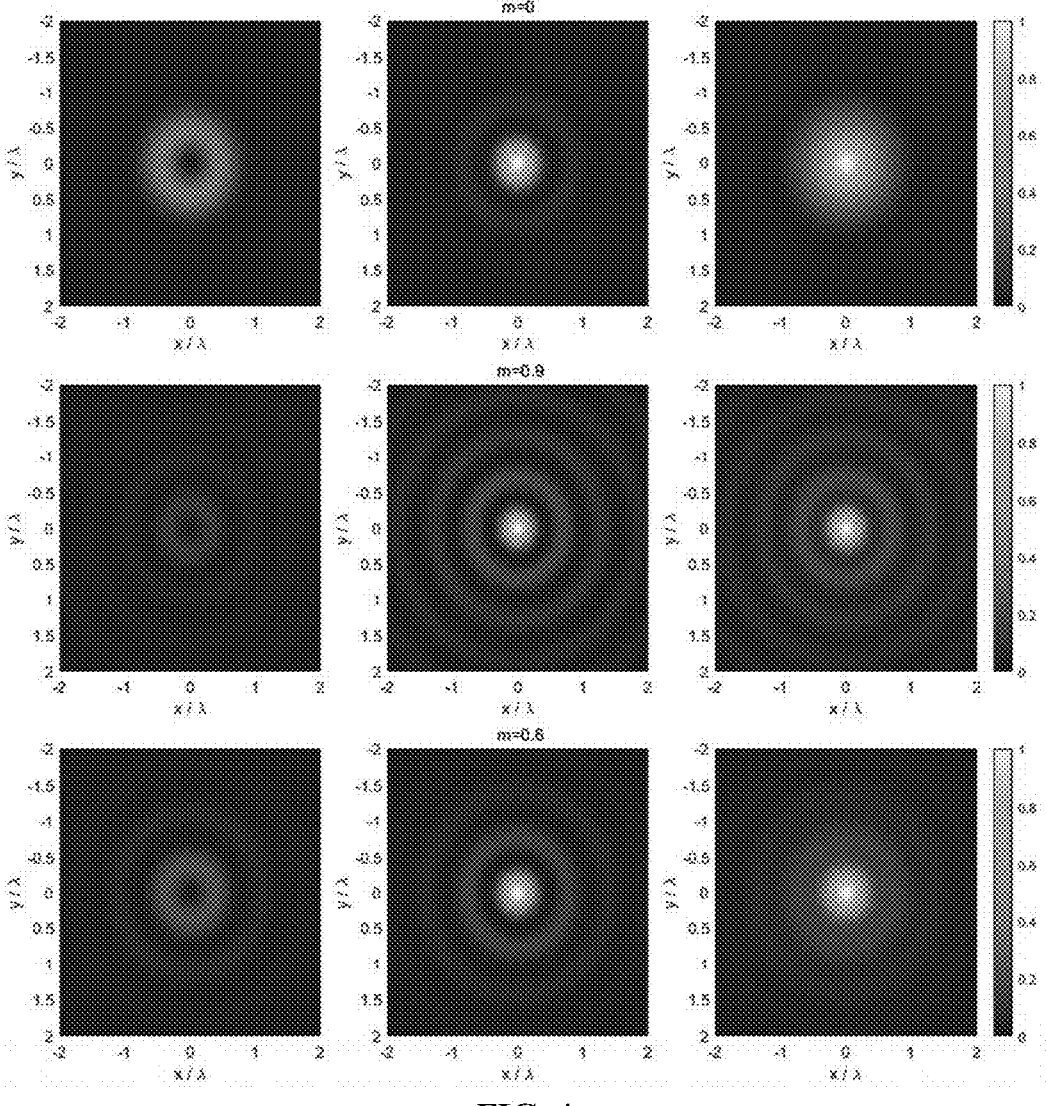
FIG. 4 is a diagram illustrating comparison near-focal-point light field distributions when focusing radially polarized light at different obscuration ratios. Rows from top to bottom correspond to obscuration ratios m=0, m=0.9, and m=0.6, respectively; and each of columns from left to right respectively represents a radial component, an axial component, and a total luminous intensity distribution, respectively.

For selection of annular beam obscuration in the system, referring to FIG. 4, as the annular obscuration coefficient m increases, a value of the FWHM x of the luminous intensity distribution near the focal point where the radially polarized light focuses may decrease gradually, a system lateral resolution being improved. However, when m increases to 0.9 or more, the luminous intensity on the focal plane where the radially polarized light focuses may decline sharply. Considering influence of factors, such as a signal-to-noise ratio of a signal received by a detector in experiment, and exposure time and a dynamic response range of the detector, etc., the annular obscuration coefficient m=0.9 for the broadband annular radially polarized light according to this disclosure.

Specifically, in the first-stage relay system, the light source 1 is located at a front focal plane of the first condenser lens 4; a back focal plane of the first condenser lens 4 coincides with a front focal plane of the second condenser lens 8; the liquid crystal spatial light modulator 6 is located at a back focal plane of the second condenser lens 8; the first condenser lens 4 and the second condenser lens 8 form a 4f system, ensuring conjugation between the light source 1 and the liquid crystal spatial light modulator 6; the polarizer 2 is arranged on an incident optical path between the light source 1 and the first condenser lens 4, ensuring that an incident beam is the linearly polarized light and a polarization direction of incident light forms an angle of 0° with a long side of a liquid crystal light valve of the liquid crystal spatial light modulator 6 form; the analyzer 10 is orthogonally oriented relative to the polarizer 2; a target image, i.e., an annular pattern with a 90% central obscuration, is loaded onto the liquid crystal spatial light modulator 6 to form a broadband annular beam. In the second-stage relay system, the liquid crystal spatial light modulator 6 is located at the front focal plane of the second condenser lens 8; the back focal plane of the second condenser lens 8 coincides with a front focal plane of the third condenser lens 11; the vortex waveplate 12 is located at a back focal plane of the third condenser lens 11; the second condenser lens 8 and the third condenser lens 11 form a 4f system, ensuring conjugation between the liquid crystal spatial light modulator 6 and the vortex waveplate 12, where polarization modulation is performed on the broadband annular beam at the vortex waveplate 12, converting the linearly polarized light into the radially polarized light. The broadband annular radially polarized light may be generated through the two-stage relay system as described above.

Figure 5:
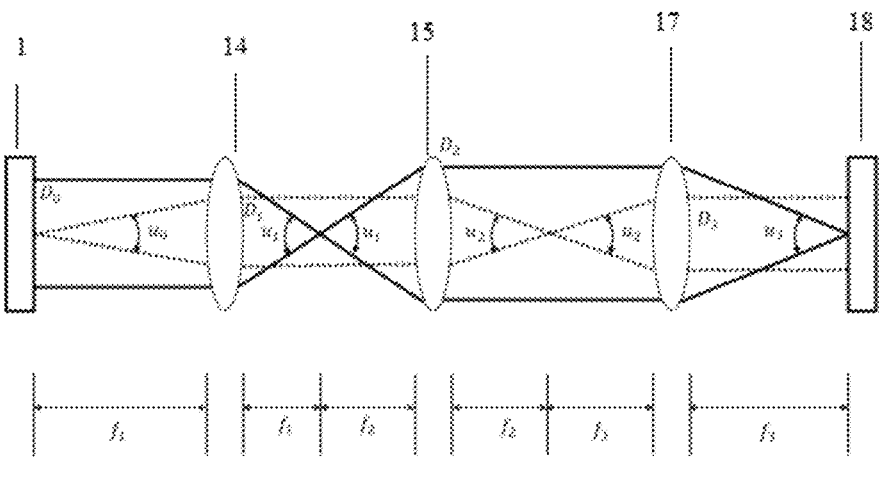
FIG. 5 is a diagram illustrating an object-image conjugate relation of a Kohler illumination system.

For selection of condenser lenses in the system, referring to FIG. 5, to ensure an experimental effect, an illumination range and an aperture angle calculated theoretically should be greater than actual required numerical values, i.e., meeting:

$$\frac{D_3}{2f_3\tan\frac{u_0}{2}} < \frac{f_1}{f_2} < \frac{D_0}{2f_3\tan\frac{u_3}{2}},$$

$D_0$ represents a diameter of a light-emitting surface of the light source 1, $D_1$ represents a light spot diameter of a central FOV beam of the light source 1 propagating to the fourth condenser lens 14, $D_2$ represents a light spot diameter of a parallel beam emitted from the light source 1 converged onto the fifth condenser lens 15 through the fourth condenser lens 14, $D_3$ represents a required illumination range on the to-be-tested sample 18, $u_0$ represents a divergence angle of the light source 1, $u_1$ and $u_2$ each are ray convergence angles of the parallel beam emitted from the light source 1 passing through the fourth condenser lens 14 and the fifth condenser lens 15, $$\frac{u_3}{2}$$

represents an object-side aperture angle of the first microscopic objective lens 17, and $f_1$, $f_2$, $f_3$ represent focal lengths of the fourth condenser lens 14, the fifth condenser lens 15, and the first microscopic objective lens 17, respectively.

Substituting Numerical Values to Calculate to Obtain $$1.42 < \frac{f_1}{f_2} < 2.21,$$

Considering correction for pupil size and aberration, it is determined that $$\frac{f_1}{f_2} = 2, f_1 = 200\,\text{nm},$$

and $f_2$=100 nm; the light source 1 is a red light light-emitting diode LED light source with a central wavelength of 629 nm and a bandwidth of 15 nm, the fourth condenser lens 14 has a focal length of 200 mm, and the fifth condenser lens 15 has a focal length of 100 mm, where condenser lenses each uses achromatic doublet glued lenses with a band range of a spectrum of a light-emitting diode LED etc.

Combed with FIG. 1 and FIG. 2, the method for super-resolution microscopic interferometric measurement based on broadband annular radially polarized light includes steps as follows:

Step 1, Designing a two-stage relay system, for generating broadband annular radially polarized light.

The two-stage relay system includes a light source 1, a polarizer 2, a first condenser lens 4, a first standard plane mirror 5, a liquid crystal spatial light modulator 6, a second condenser lens 8, a first cube beamsplitter 9, an analyzer 10, a third condenser lens 11, and a vortex waveplate 12.

The first condenser lens 4 and the second condenser lens 8 constitute a first-stage relay lens group 3.

The second condenser lens 8 and the third condenser lens 11 constitute a second-stage relay lens group 7.

The light source 1, the polarizer 2, the first-stage relay lens group 3, the first standard plane mirror 5, the liquid crystal spatial light modulator 6, and the first cube beamsplitter 9 constitute a first-stage relay system.

The liquid crystal spatial light modulator 6, the second-stage relay lens group 7, the first cube beamsplitter 9, the analyzer 10, and the vortex waveplate 12 constitute a second-stage relay system.

The light source 1, the polarizer 2, the first condenser lens 4, and the first standard plane mirror 5 are arranged coaxially in sequence along a first optical axis, where a reflective surface of the first standard plane mirror 5 forms an angle of 45° with the first optical axis.

The liquid crystal spatial light modulator 6, the second condenser lens 8, the first cube beamsplitter 9, the analyzer 10, the third condenser lens 11, and the vortex waveplate 12 are arranged coaxially in sequence along a second optical axis, where the first cube beamsplitter 9 is located on a reflection optical path of the first standard plane mirror 5, and the broadband annular radially polarized light emerges from the vortex waveplate 12.

Step 2, building a system for super-resolution microscopic interferometric measurement based on broadband annular radially polarized light.

The system for super-resolution microscopic interferometric measurement based on broadband annular radially polarized light includes the two-stage relay system, a fourth condenser lens 14, a fifth condenser lens 15, a second cube beamsplitter 16, a first microscopic objective lens 17, a to-be-tested sample 18, a lead zirconate titanate (PZT) piezoelectric ceramics 19, a second microscopic objective lens 20, a second standard plane mirror 21, a tube lens 22, and an industrial charge-coupled device CCD camera 23, where the to-be-tested sample 18 is arranged on the PZT piezoelectric ceramics 19.

The fourth condenser lens 14, the fifth condenser lens 15, the second cube beamsplitter 16, the first microscopic objective lens 17, and the to-be-tested sample 18 are arranged coaxially behind the vortex waveplate 12 along the second optical axis; a third optical axis passes through the second cube beamsplitter 16; the second standard plane mirror 21, the second microscopic objective lens 20, the second cube beamsplitter 16, the tube lens 22, and the industrial CCD camera 23 are distributed in sequence along the third optical axis; and the third optical axis is perpendicular to the second optical axis.

The first microscopic objective lens 17, the to-be-tested sample 18, and the PZT piezoelectric ceramics 19 constitute a test optical path, while the second microscopic objective lens 20 and the second standard plane mirror 21 constitute a reference optical path.

The fourth condenser lens 14 and the fifth condenser lens 15 constitute a Kohler illumination lens group 13.

Step 3, Emitting, from the light source 1, a multi-field-of-view FOV beam; where: the multi-FOV beam passes through the polarizer 2 to generate a linearly polarized light; the linearly polarized light passes through the first condenser lens 4 to be converged onto the first standard plane mirror 5, and is then reflected from the first standard plane mirror 5 by 90°, onto the first cube beamsplitter 9; first reflected light reflected from the first cube beamsplitter 9 passes through the second condenser lens 8 to the liquid crystal spatial light modulator 6, the first reflected light being linearly polarized light with a polarization direction same as a long-side direction of a liquid crystal light valve of the liquid crystal spatial light modulator 6; hollow annular modulation and reflection is performed, by the liquid crystal spatial light modulator 6, on the linearly polarized light incident thereto to obtain a modulated annular beam as second reflected light; the second reflected light passes through the second condenser lens 8 to the first cube beamsplitter 9, passes through the analyzer 10, with a polarization direction perpendicular to the polarizer 2, through the first cube beamsplitter 9, and is then converged onto the vortex waveplate 12 through the third condenser lens 11, where the vortex waveplate 12 performs polarization modulation on a full-FOV beam to output the broadband annular radially polarized light; the broadband annular radially polarized light then passes through the Kohler illumination lens group 13 to the second cube beamsplitter 16, and is split, by the second cube beamsplitter 16, into test light and reference light, where the test light is transmitted to the first microscopic objective lens 17 and passes through the first microscopic objective lens 17 to illuminate the to-be-tested sample 18, and third reflected light carrying surface morphology information of the to-be-tested sample 18 reflected from the to-be-tested sample 18 passes through the first microscopic objective lens 17 to the second cube beamsplitter 16, is reflected from the second cube beamsplitter 16 into the tube lens 22, and is focused, by the tube lens 22, onto the industrial CCD camera 23, and where the reference light is reflected to the second microscopic objective lens 20 and passes through the second microscopic objective lens 20 to illuminate the second standard plane mirror 21, and fourth reflected light carrying surface morphology information of the second standard plane mirror 21 reflected from the second standard plane mirror 21 passes through the second microscopic objective lens 20 to the second cube beamsplitter 16, transmits into the tube lens 22 through the second cube beamsplitter 16, and is focused, by the tube lens 22, onto the industrial CCD camera 23, where meanwhile the reference light and the test light interfere with each other;

Step 4, Controlling, using the PZT piezoelectric ceramics 19, micro-displacement of the to-be-tested sample along a direction of an optical axis 18, and acquiring, by the industrial CCD camera 23, several phase-shifted interferograms of the to-be-tested sample 18 within a full-FOV range of the first microscopic objective lens 17

Step 5, Processing, using a vertical scan interference algorithm, the acquired phase-shifted interferograms to obtain 3D topography information of the to-be-tested sample 18.

What is claimed is:

1. A method for super-resolution microscopic interferometric measurement based on broadband annular radially polarized light, comprising:

Step 1: designing a two-stage relay system, for generating broadband annular radially polarized light, wherein the two-stage relay system comprises a light source (1), a polarizer (2), a first condenser lens (4), a first standard plane mirror (5), a liquid crystal spatial light modulator (6), a second condenser lens (8), a first cube beamsplitter (9), an analyzer (10), a third condenser lens (11), and a vortex waveplate (12);

the first condenser lens (4) and the second condenser lens (8) constitute a first-stage relay lens group (3);

the second condenser lens (8) and the third condenser lens (11) constitute a second-stage relay lens group (7);

the light source (1), the polarizer (2), the first-stage relay lens group (3), the first standard plane mirror (5), the first cube beamsplitter (9), and the liquid crystal spatial light modulator (6) constitute a first-stage relay system;

the liquid crystal spatial light modulator (6), the second-stage relay lens group (7), the first cube beamsplitter (9), the analyzer (10), and the vortex waveplate (12) constitute a second-stage relay system;

the light source (1), the polarizer (2), the first condenser lens (4), and the first standard plane mirror (5) are arranged coaxially in sequence along a first optical axis, wherein a reflective surface of the first standard plane mirror (5) forms an angle of 45° with the first optical axis; and the liquid crystal spatial light modulator (6), the second condenser lens (8), the first cube beamsplitter (9), the analyzer (10), the third condenser lens (11), and the vortex waveplate (12) are arranged coaxially in sequence along a second optical axis, wherein the first cube beamsplitter (9) is located on a reflection optical path of the first standard plane mirror (5), and the broadband annular radially polarized light emerges from the vortex waveplate (12);

Step 2: building a system for super-resolution microscopic interferometric measurement based on broadband annular radially polarized light, wherein the system for super-resolution microscopic interferometric measurement based on broadband annular radially polarized light comprises the two-stage relay system, a fourth condenser lens (14), a fifth condenser lens (15), a second cube beamsplitter (16), a first microscopic objective lens (17), a to-be-tested sample (18), a PZT piezoelectric ceramics (19), a second microscopic objective lens (20), a second standard plane mirror (21), a tube lens (22), and an industrial CCD camera (23), wherein the to-be-tested sample (18) is arranged on the PZT piezoelectric ceramics (19);

the fourth condenser lens (14), the fifth condenser lens (15), the second cube beamsplitter (16), the first microscopic objective lens (17), and the to-be-tested sample (18) are arranged coaxially behind the vortex waveplate (12) along the second optical axis; a third optical axis passes through the second cube beamsplitter (16); the second standard plane mirror (21), the second microscopic objective lens (20), the second cube beamsplitter (16), the tube lens (22), and the industrial CCD camera (23) are distributed in sequence along the third optical axis; and the third optical axis is perpendicular to the second optical axis;

the first microscopic objective lens (17), the to-be-tested sample (18), and the PZT piezoelectric ceramics (19) constitute a test optical path, while the second microscopic objective lens (20) and the second standard plane mirror (21) constitute a reference optical path; and the fourth condenser lens (14) and the fifth condenser lens (15) constitute a Kohler illumination lens group (13);

Step 3: emitting, from the light source (1), a multi-field-of-view FOV beam, wherein: the multi-FOV beam passes through the polarizer (2) to generate a linearly polarized light; the linearly polarized light passes through the first condenser lens (4) to be converged onto the first standard plane mirror (5), and is then reflected from the first standard plane mirror (5) by 90°, onto the first cube beamsplitter (9); first reflected light reflected from the first cube beamsplitter (9) passes through the second condenser lens (8) to the liquid crystal spatial light modulator (6), the first reflected light being linearly polarized light with a polarization direction same as a long-side direction of a liquid crystal light valve of the liquid crystal spatial light modulator (6); hollow annular modulation and reflection is performed, by the liquid crystal spatial light modulator (6), on the linearly polarized light incident thereto to obtain a modulated annular beam as second reflected light; the second reflected light passes through the second condenser lens (8) to the first cube beamsplitter (9), passes through the analyzer (10), with a polarization direction perpendicular to the polarizer (2), through the first cube beamsplitter (9), and is then converged onto the vortex waveplate (12) through the third condenser lens (11), wherein the vortex waveplate (12) performs polarization modulation on a full-FOV beam to output the broadband annular radially polarized light; the broadband annular radially polarized light then passes through the Kohler illumination lens group (13) to the second cube beamsplitter (16), and is split, by the second cube beamsplitter (16), into test light and reference light, wherein the test light is transmitted to the first microscopic objective lens (17) and passes through the first microscopic objective lens (17) to illuminate the to-be-tested sample (18), and third reflected light carrying surface morphology information of the to-be-tested sample (18) reflected from the to-be-tested sample (18) passes through the first microscopic objective lens (17) to the second cube beamsplitter (16), is reflected from the second cube beamsplitter (16) into the tube lens (22), and is focused, by the tube lens (22), onto the industrial CCD camera (23), and wherein the reference light is reflected to the second microscopic objective lens (20) and passes through the second microscopic objective lens (20) to illuminate the second standard plane mirror (21), and fourth reflected light carrying surface morphology information of the second standard plane mirror (21) reflected from the second standard plane mirror (21) passes through the second microscopic objective lens (20) to the second cube beamsplitter (16), transmits into the tube lens (22) through the second cube beamsplitter (16), and is focused, by the tube lens (22), onto the industrial CCD camera (23), where meanwhile the reference light and the test light interfere with each other;

Step 4: controlling, using the PZT piezoelectric ceramics (19), micro-displacement of the to-be-tested sample (18) along a direction of an optical axis, and acquiring, by the industrial CCD camera (23), several phase-shifted interferograms of the to-be-tested sample (18) within a full-FOV range of the first microscopic objective lens (17); and Step 5: processing, using a vertical scan interference algorithm, the acquired phase-shifted interferograms to obtain 3D topography information of the to-be-tested sample (18).

2. The method according to claim 1, wherein the light source (1) is a broad-spectrum light source with an extended surface, with a band range of visible light, and with a coherence length far less than a coherence length of a laser light source, wherein through modulation of an interference signal by rapid attenuation of a coherence envelope, a significant interference signal occurs just when an optical path difference between a detection light and the reference light is close to zero; and a divergence angle of the light source (1) is matched to a to-be-tested FOV at an object side, uniform illumination covering the to-be-tested FOV and having a certain aperture angle is provided through a Kohler illumination system, where a full-FOV interferogram is obtained directly without performing spot scan on the to-be-tested sample (18) using an electric displacement platform, when performing microscopic interference imaging on the to-be-tested sample (18), low efficiency brought about by conventional laser spot scan being broken.

3. The method according to claim 2, wherein the broadband annular radially polarized light meets that:

electric field distribution E and luminous intensity distribution I near a focal point under illumination of the broadband annular radially polarized light are expressed as:

$$E = E_r + E_z,$$

$$I = E \cdot \bar{E},$$

wherein $E_r$ represents a radial polarization component, $E_z$ represents an axial polarization component, and $\bar{E}$ represents a conjugate of E;

through simulating electric field distributions near the focal point under illumination of the broadband annular radially polarized light at different annular obscuration coefficients, a relationship among an annular obscuration coefficient, a full width at half maximum FWHM of the luminous intensity distribution near the focal point and a maximum value of luminous intensity on a focal plane is fitted using a least squares method, to obtain function expressions as follows:

$$x(m) = -0.053 \cdot m^2 - 0.1529 \cdot m + 0.4012,$$

$$I_{max}(m) = -0.353 \cdot m^2 - 0.088 \cdot m + 0.365,$$

wherein m represents the annular obscuration coefficient, x(m) represents the FWHM of the luminous intensity distribution near the focal point, and $I_{max}(m)$ represents the maximum value of the luminous intensity on the focal plane.

4. The method according to claim 3, wherein the annular obscuration coefficient m=0.9.

5. The method according to claim 4, wherein a Linnik-type interference optical path is used for the system for super-resolution microscopic interferometric measurement based on broadband annular radially polarized light in Step 2; two identical microscopic objective lenses are used respectively for the test optical path and the reference optical path; and combined with illumination of the broadband annular radially polarized light, an interference signal $I_{q,image}(x, y)$ actually received during vertical scan is expressed as:

$$I_{q,image}(x, y) = I_q(x, y) * psf(x, y),$$

$$I_q(x, y) = I'\Big(1 +$$
$$\exp\Big\{-4\Big[\frac{h(x, y) + q \cdot \Delta z - z_0}{l_c}\Big]^2\Big\} \cos\Big\{\frac{4\pi}{\lambda}[h(x, y) + q \cdot \Delta z - z_0] + \emptyset_0\Big\}\Big)$$

wherein $I_q(x, y)$ represents a scan interference signal without taking account of a diffraction effect;

psf(x, y) represents a point spread function, psf(x, y)=I=E·$\bar{E}$;

h(x, y) represents a surface morphology function of the to-be-tested sample;

I' represents a luminous intensity sum of a test arm and a reference arm;

$z_0$ represents a location where the test optical path and the reference optical path have equal optical paths, and $\emptyset_0$ represents a phase of the interference signal in case of the equal optical paths;

$\Delta z$ represents a scan step size, q represents a scan step number, and a scan full length z=q·$\Delta z$;

$l_c$ represents the coherence length of the light source (1); and $\lambda$ represents a central wavelength of the light source (1);

according to a calibration rule for a white light microscopic interferometer specified in guidelines VDI/VDE2655-1.1, a 3D resolution $\nabla_{3D}(m)$ of a system for super-resolution microscopic interferometry is expressed as:

$$\Lambda_{3D}(m) = a \cdot x(m) = a \cdot (-0.053 \cdot m^2 - 0.1529 \cdot m + 0.4012),$$

wherein a represents a coefficient related to a structural characteristic of the to-be-tested sample (18); and x(m) represents the FWHM of the luminous intensity distribution near the focal point, characterizing a lateral resolution of the system for super-resolution microscopic interferometry; and as the annular obscuration coefficient m increases, the lateral resolution of the system for super-resolution microscopic interferometry is improved, so that the 3D resolution $\nabla_{3D}$ is improved.

6. The method according to claim 5, wherein the light source (1) is located at a front focal plane of the first condenser lens (4), the first condenser lens (4) and the second condenser lens (8) are confocal, the liquid crystal spatial light modulator (6) is located at a back focal plane of the second condenser lens (8), the second condenser lens (8) and the third condenser lens (11) are confocal, the vortex waveplate (12) is located at a back focal plane of the third condenser lens (11), the fourth condenser lens (14) and the fifth condenser lens (15) are confocal, the fifth condenser lens (15) and the first microscopic objective lens (17) are confocal, the to-be-tested sample (18) is located at a back focal plane of the first microscopic objective lens (17), and the second standard plane mirror (21) is located at a back focal plane of the second microscopic objective lens (20).

7. The method according to claim 6, wherein the test optical path and the reference optical path are completely consistent, wherein a location of the to-be-tested sample (18) in the test optical path corresponds to a location of the second standard plane mirror (21) in the reference optical path.

8. The method according to claim 7, wherein the condenser lenses each are an achromatic lens, with a band range of a spectrum of LED, etc.

9. The method according to claim 8, wherein the liquid crystal spatial light modulator is an amplitude-type reflective liquid crystal spatial light modulator, configured to generate the annular beam.

10. The method according to claim 1, wherein the first microscopic objective lens (17) and the second microscopic objective lens (20) each are an ordinary objective lens with a numerical aperture (NA) greater than 0.85.

* * * * *